(12) United States Patent
Spryshak

(10) Patent No.: US 7,699,690 B2
(45) Date of Patent: Apr. 20, 2010

(54) SINGLE POINT DIRECT ACTUATION OF TWO AIR DEVICES

(75) Inventor: Joseph J. Spryshak, Hartland, MI (US)

(73) Assignee: Valeo Climate Control Corp., Auburn Hills, MI (US)

( * ) Notice: Subject to any disclaimer, the term of this patent is extended or adjusted under 35 U.S.C. 154(b) by 554 days.

(21) Appl. No.: 11/476,237

(22) Filed: Jun. 28, 2006

(65) Prior Publication Data
US 2008/0000628 A1    Jan. 3, 2008

(51) Int. Cl.
*B60H 1/06* (2006.01)

(52) U.S. Cl. ...................... 454/139; 454/143

(58) Field of Classification Search .............. 454/300
See application file for complete search history.

(56) References Cited

FOREIGN PATENT DOCUMENTS

| EP | 656272 A1 * | 6/1995 |
| FR | 2766760 | 2/1999 |
| FR | 2878469 | 6/2006 |

OTHER PUBLICATIONS

Abstract translation of EP 656272 A!.*

* cited by examiner

*Primary Examiner*—Steve McAllister
*Assistant Examiner*—Helena Kosanovic
(74) *Attorney, Agent, or Firm*—Dierker & Associates, P.C.

(57) ABSTRACT

An HVAC unit having a multiple air valve unit comprising two air valve devices sharing at least one common rotation axis is described.

Concentric air valve device shafts interface with a common actuation device in such way to allow for rotational motion between the actuation device and the air valve device unit, and to allow to air valve devices to control or distribute air into three or more air outlets of the HVAC unit.

21 Claims, 11 Drawing Sheets

SINGLE POINT DIRECT ACTUATION OF TWO AIR DEVICES

FIELD OF THE INVENTION

The present invention relates to HVACs having valves for directing or controlling air to at least three different parts or areas of HVAC unit or system.

BACKGROUND OF THE INVENTION

HVAC units generally provide both conditioned and non-conditioned air to various locations via paths or airways. In general, these paths or airways are guided by ducts or other such structural means to ensure that the air coming from the HVAC unit reaches the proper destination and with the desired air temperature.

In the automotive context, for example, air from the HVAC is often conducted to various regions, both inside and outside of the vehicle. Conditioned air or non-conditioned and conditioned air mixed together, often exits or is 'outletted' or discharged to various areas of the vehicle to provide for passenger comfort. To achieve such comfort, air that passes through the HVAC unit arrives, with the help of air directing and/or air controlling devices, (such as valves, flaps, doors or other such air directing and controlling devices.), into outlets and, eventually paths that lead out of the HVAC unit.

There is, therefore, a need to have means to control the air directing and/or air controlling devices, such as, for example, valves, flaps, doors or other such similar air directing and/or controlling devices, to ensure that air reaches its destination in the proper volumes, and the proper speeds, and/or at the proper temperatures. In automotive HVAC units, it is often necessary to control air flows to more than one outlet from the unit. In fact, the desired control of air flows to multiple outlets via multiple air paths is often difficult to obtain, since to control air flow to multiple outlet paths, multiple air valves, flaps or other such air directing and controlling devices, is needed. For example, in the prior art, in HVAC units with three possible outlet paths, it is common to use two or more air valves. Each valve is motion controlled via an actuation source. The actuation source may be electric actuator motors, pneumatic actuation device, or a mechanical connection to the user control knob or lever (collectively referred to herein as actuator devices).

In addition, it is required that there be a means of transferring the mechanical motion from the actuation source to the air valve. This has generally be achieved by mechanical links, levers, gears or cams, or direct mechanical connection to the actuation device, (motion transferors) such solutions requiring a separate actuation device for each air valve. Alternatively, proper air flows and/or air characteristics may be found by reducing the quantity of air valves, thereby reducing the complexity of controlling the motion of each air valve, reducing the cost and increasing reliability.

With the current state of the art, multiple actuation devices are used for multiple air directing and/or air controlling devices, therefore providing for HVAC systems either with additional parts consisting of mechanical links, levers, gears or cams, or with additional parts particularly required for the use of the multiple actuation devices. These extra parts not only add cost, but may also reduce the reliability of the system. In addition, when mechanical links, levers, gears or cams are utilized, positional accuracy of the air valve, for example, with respect to the actuation device, is degraded, resulting in less control directing air flow to the desired outlet or of the temperature of the outlet air and increased potential for quality problems such as binding, noise, and incorrect airflow. The mechanical component such as links, levers, gears or cams require a high level of geometric accuracy and cam bind, disengage, or causes noises such as squeaks and rattles and thumps if not dimensioned correctly.

SUMMARY OF THE INVENTION

Automotive HVAC units commonly have a number of parts—either number of actuation devices or the number of mechanical link parts connecting the air valves to actuation devices. In addition, complex mechanical link systems to actuate multiple air valves are a common part of automotive HVAC units. The packaging volume of a typical automotive HVAC unit, due to the multiple pieces including air valves and mechanical linking parts, can be restrictive in a number of otherwise desirable designs. Assembly of an HVAC unit is also facilitated because there are fewer parts to assemble.

Various aspects of the present invention present the advantage of eliminating, in all or in part, the complex mechanical link system commonly utilized to actuate multiple air valves. Hereinafter, the term air valve and, specifically, air valve device, includes flaps, doors, and other air directing and/or controlling means which are useful either in directing air flow or controlling air flow that enters and exits or is discharged from a part of the HVAC unit. The present invention, in various aspects, actuates multiple air directing and/or air controlling devices, such as a multiple air valve unit with more than one air valve device, with only one actuation device, and no links, levers or gears.

In various aspects of the present invention, multiple air valve units are provided that have a common axis of rotation, e.g. the range of motion of two or more of the air valve devices overlap or cover all or part of the outlet or outlets, or are co-axial.

By multiple air valve unit it is meant at least two air valve devices connected via at least one common shaft, or preferably, two shafts that are actuated by one actuation device and that direct and/or control air passage into three or more air outlets.

The present invention, in numerous embodiments, solves the above-identified problems by providing for an alternative system for controlling "valves" without the need for links, levers, or gears, and in minimal packaging space.

The present invention, in numerous embodiments, provides for an HVAC unit (system) that has a number of air outlets. In particular, the present invention comprises an HVAC unit (system) having three or more air outlets. In various aspects, the HVAC unit of the present invention reduces the overall package volume for the HVAC system per design specification required to achieve functionality typical of a traditional HVAC mode control for a three, or possible more, outlet system comprising an air valve device or devices. The number of components required to achieve the functionality of a three outlet system is provided, by aspects of the present invention, by utilizing N−1 valves in the system, i.e. the number of components required to achieve the functionality in a three outlet (N=3) system is reduced to two (N−1) air valves, with one actuation source (such as an actuator or other actuation device) and one repulsion mechanism, such as a spring.

When the number of air valve devices is reduced to less than N−1 in prior art designs, (where N is the number of air outlets and is greater than or equal to 3), air sealing is typically poor because when one or more of the air valve devices is activated into position, at least one position will have a seal that is not in compression. Uncompressed seals have high potential for leaking. Sliding seals increase the effort for creating motion and typically have durability problems due to shear forces on the seal material. The package space for each air valve device requires that the entire volume of space defined by the range of motion of the air valve be reserved only for the air valve motion. Therefore when the air valve is not occupying the space for one position of the air valve device, that space can not be occupied by other components and is wasted package space.

Other advantages of the present invention include maximization of the positional accuracy (due to eliminating parts and therefore variability between the actuator and door) of the air valve devices, ability to utilize optimal compression seal designs and ability to utilize air valve geometry that minimizes torque at the door rotation axis imposed due to air flow impingement. Because the surface of the door is generally parallel to the air flow direction, the door area perpendicular to airflow is near zero. Since the torque imposed on the door due to the airflow forces is $M=(P \times A) \times L$, $P$=pressure, $A$=Area, and $L$=moment arm, the torque M is near zero when the area is near zero.

The various aspects of the present invention allow for decreased need for both 1) mechanical links, levers, gears or cams, and 2) multiple actuation sources. By providing for direct contact of the actuator output shaft and both valves, links, levers, gears or cams are not required, and the actuation source components are reduced by one since separate actuation sources are not needed for every air valve device.

In other aspects of the present invention, compression is provided. By utilizing the system of the present invention, various aspects provide for the use of compression air seals only around the perimeter of the air valves devices.

In various aspects of the present invention, a direct mechanical connection from the actuation source to the air valve device is provided. For every $N_a$ of air valve devices, the number of actuation device is at least $N_a-1$ actuation devices. At least one actuation source is provided for two or more air valve devices.

In HVAC units having compression seals, by providing for only one actuation source for two or more air valve devices, the seal quality is maximized. The compression seal quality is improved due to the fact that it is no longer necessary for any one seal to contact more than two surfaces. In addition, due to the valve geometry with respect to airflow velocity vectors, the effort to move the air valve is minimized. In various aspects of the present invention, such minimalization of effort and seal effect means that durability is maximized. Especially preferred is a maximum of one actuation source for every two air valve devices.

In various aspects of the present invention, the air valve device is of a shape that it is curved, with at least one face like a hollowed out football or barrel (so called barrel shaped device). In aspects of the present invention utilizing a barrel geometry, such as a barrel shaped device, a particular embodiment known as a barrel door, air flow impingement is reduced or eliminated, as well as a reduction of torque over other geometries so that the torque required to move the air valve is minimalized.

In various aspects, parts of the air valve devices can overlap or nest, providing for specialized control under certain circumstances, particularly where sealing at one or more positions is not required.

DETAILED DESCRIPTION OF THE INVENTION

In various aspects of the present invention, an HVAC unit is provided having three or more air outlets. Air valves are arranged in a configuration wherein two air valve devices are required to achieve the functionality of an automotive HVAC mode system comprising three air outlets.

Figure 1A:
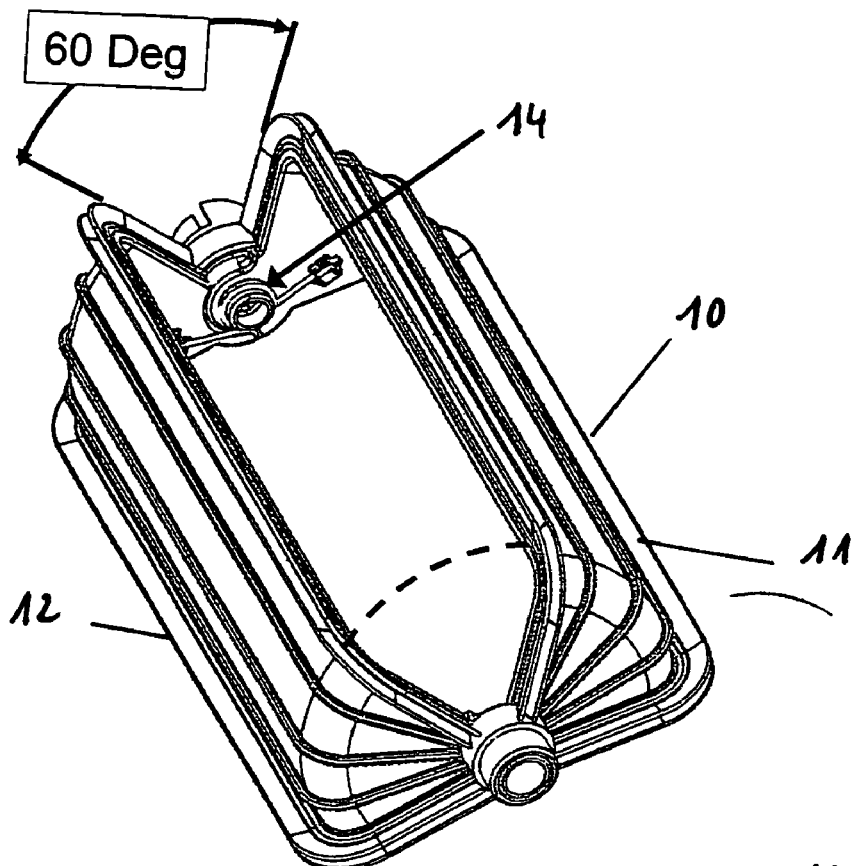
FIGS. 1a and 1b show two barrel shaped air valve devices with a spring to provide force between devices, in accordance with an aspect of the present invention.
Figure 1B:
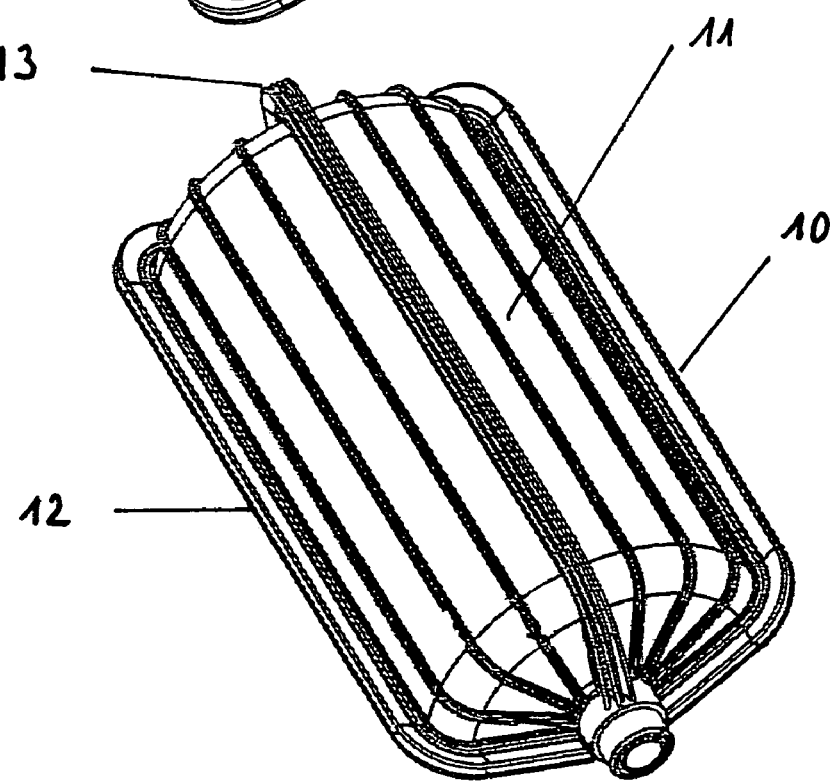

FIGS. 1a and 1b show an HVAC unit with an arrangement of first, second and third air outlets. For example, an outlet leading to the floor of an automotive vehicle cockpit or passenger compartment is provided in the center of panel and defrost outlets. Other outlets, so called defrost air outlets, lead to an area of the vehicle where defrost needs occur.

The HVAC unit outlets are provided with air valves arranged in a configuration such that each door shares the same, or 'common' axis of rotation. The axis of the first air valve forms an inner shaft that is surrounded by the hollow axis of the second air valve. An actuation device interfaces with the shafts of the air valves by means of a portion of one of the shafts, for example, that is flat on one or another, or preferably, both sides, having a rectangular cross section of high aspect ratio.

Herein below illustrates such high aspect ratio.

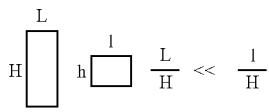

Such physical mechanism will hereafter be referenced as an actuator blade. The physical mechanism whereby actuation can cause both air devices to move in response to the command or demand of one actuation device, is commonly referred to as a blade, tab or extension (collectively referred to herein as an 'actuator blade'), such actuator blade serving as a means to turn the doors relative to one another.

FIGS. 1a and 1b illustrate multiple air valve unit (10), with air valves devices (11, 12) which form a seal (13) together when closed. Repulsion device (14) is a spring, which open the seal (13) the two air valves (11, 12) at an angle up to 60°.

As described herein, a hollow outer shaft of a first air valve can be slotted in a manner that allows an actuation blade to rotate freely with respect to the first air valve by an angle equal to the total rotation angle of a second air valve. The inner shaft of the second air valve device can also be slotted in a manner that allows the actuation blade to rotate freely with respect to the second air valve by an angle equal to the total rotation angle of the first air valve.

A repulsion mechanism, such as a spring, in various aspects of the present invention, is utilized to apply a force to separate a first air valve device from a second air valve device. This force creates a torque on the air valve devices which is less than the torque from the actuation device, the torque required to compress the seal between first and second air valve devices to the desired compression ratio. This force is greater than the force of gravity applied to the air valve device plus the force of the airflow impingement applied to the air valve.

In one embodiment, this force will be created by a mechanism, herein referred to as a repulsion device, such as a spring. In another embodiment, the force is created by an alternative device or mechanism, such as a magnetic seal. Force can additionally be created by weighting air valve devices, e.g. using different weighted doors in place of the spring.

Figure 2:
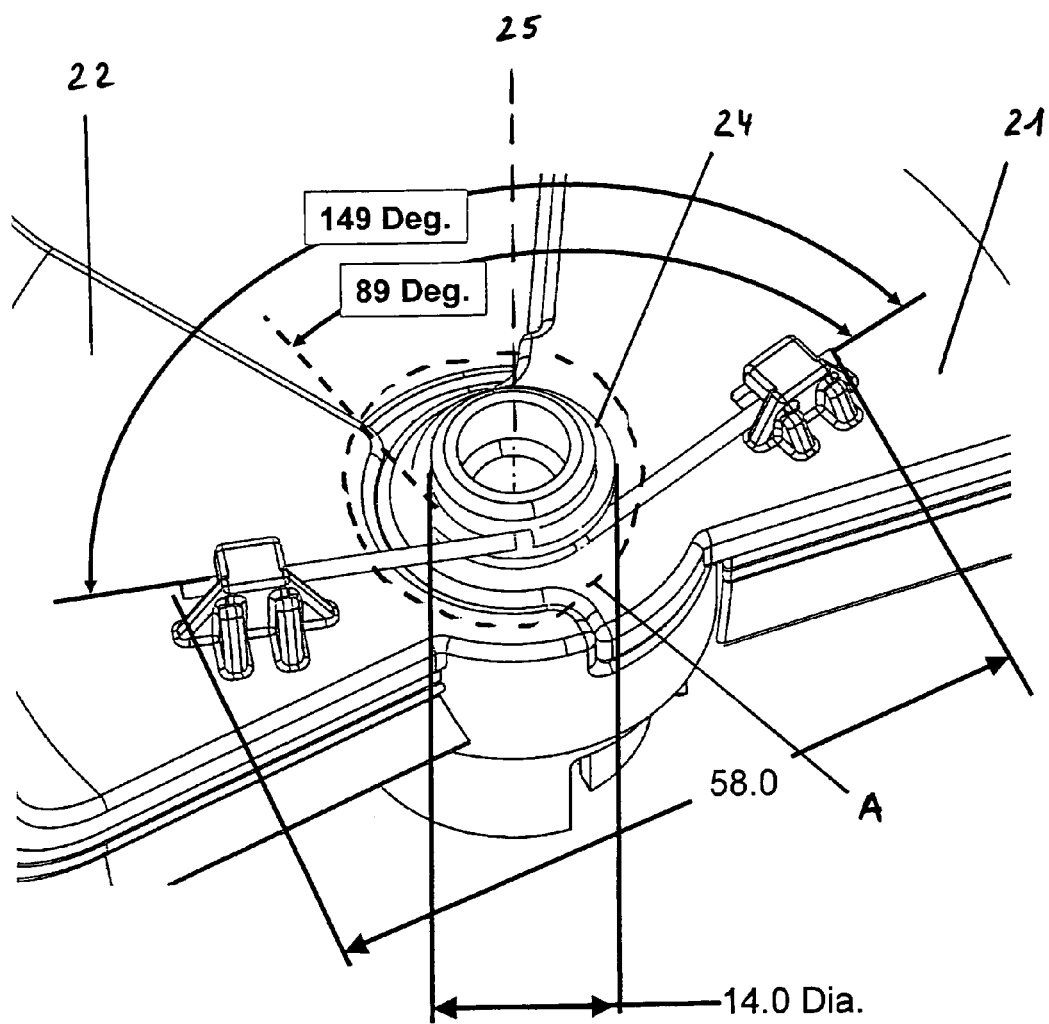
FIG. 2 shows a close up of the spring mechanism used to provide repulsive force between two air valve devices, in accordance with an aspect of the present invention.

FIG. 2 illustrates the repulsion device (24) and first air valve device (21) and second air valve device (22) rotating around common axis (25). Both air valves (21, 22) can be activated at area A via a common motion transferor or directly by actuator (not shown).

Figure 3A:
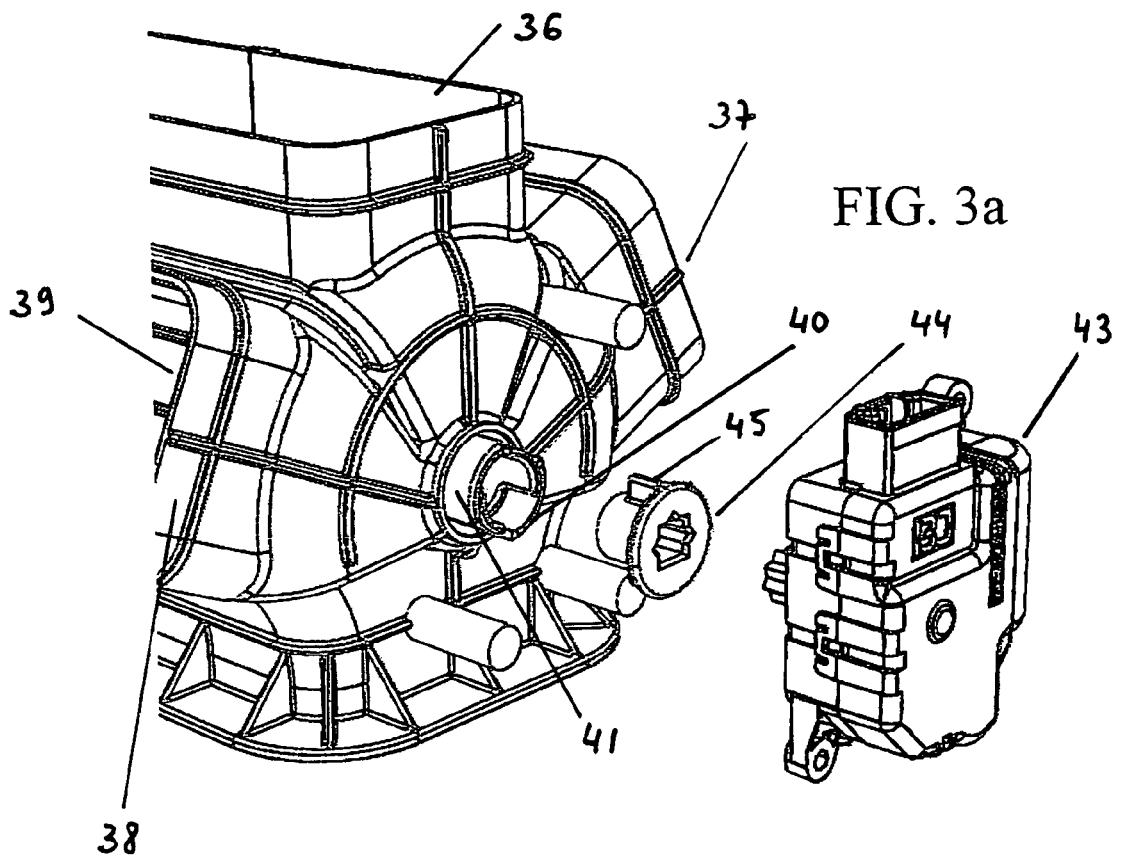
FIGS. 3a and 3b show an HVAC unit section with a first second and third outlet, an air valve device, and an actuation device, in accordance with an aspect of the present invention.
Figure 3B:
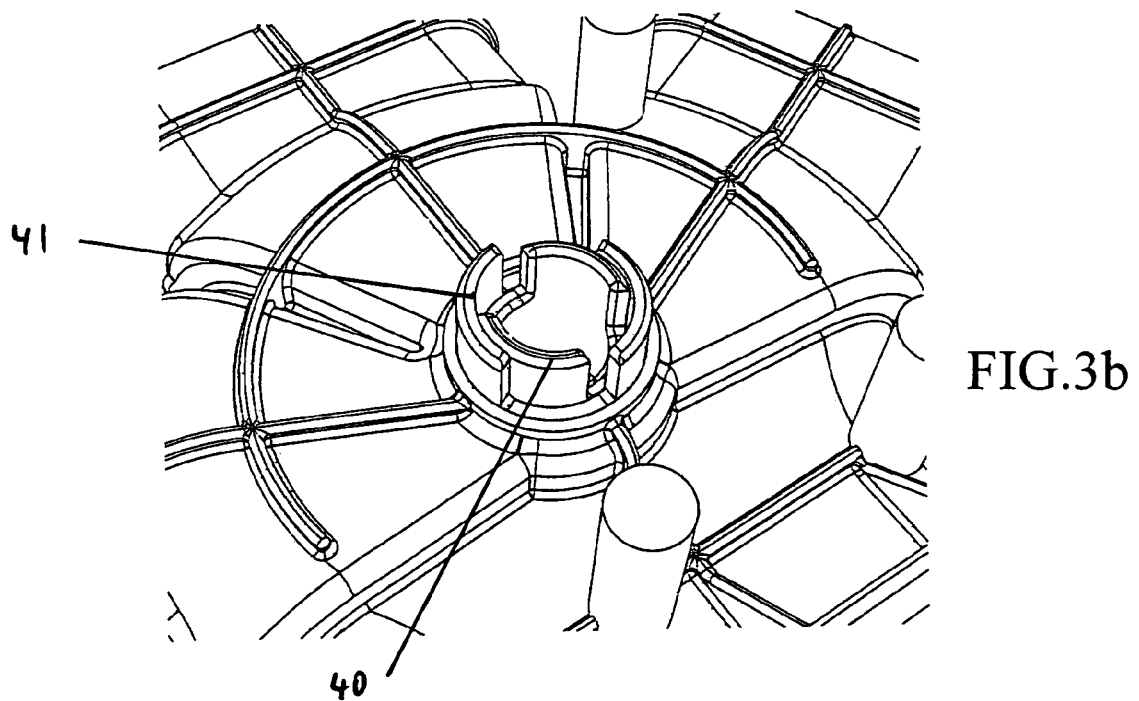

FIG. 3a shows three HVAC air outlets, first air outlet (36), second air outlet (37) and third air outlet (38), with first air valve device (39) also shown. Second air valve device shaft (40) and first air valve device shaft (41) as shown on FIGS. 3a and 3b, and turn around a common axis and are locating in housing (42) of the HVAC unit.

FIG. 3a shows actuation means (43) and motion transferor (44) with actuator blade (45) which directly interfaces with both shafts (40, 41), to rotate air valves devices 39 and 40 (not shown), to allow air to be delivered or control air access to outlets (36, 37, 38).

Figure 4A:
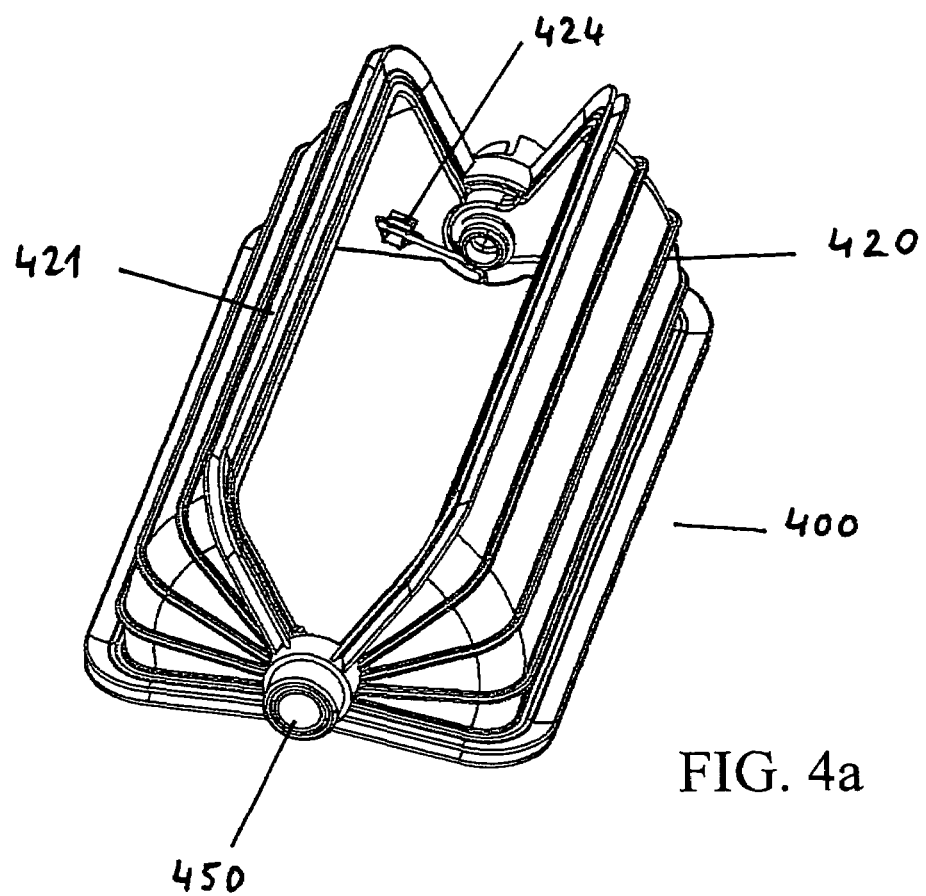
FIGS. 4a and 4b show another perspective view of air valve devices showing a common shaft, with spring mechanism attached to air valve devices, in accordance with an aspect of the present invention.
Figure 4B:
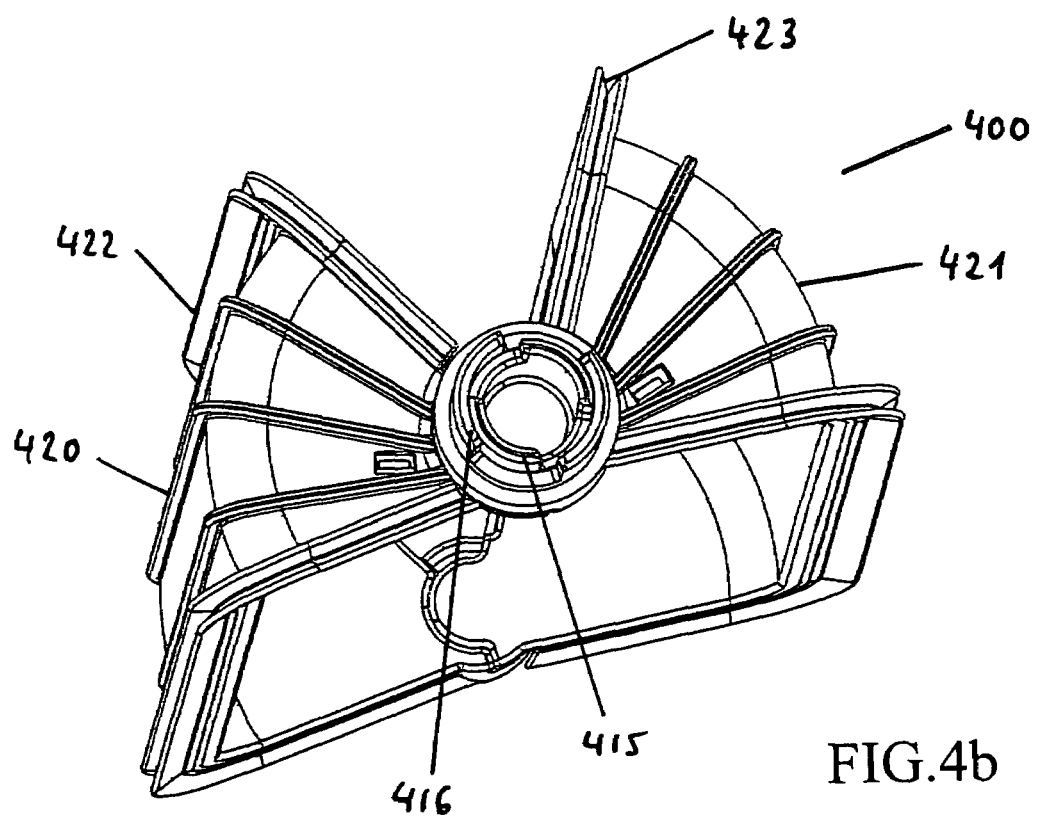

FIGS. 4a and 4b show multiple air valve unit (400) with air valve devices (411, 420) and bearing (450) on one side. Sealing portions (422, 423) of air valve devices (424) has air valve devices (411, 410), in closed position, is illustrated. Concentric shafts (415, 416) providing for shaft interfaces, relating to air valve devices (420, 421) respectively are present, and shafts directly interface with motion transferor (not shown) or actuator (not shown), to turn both air valve devices.

Figure 5A:
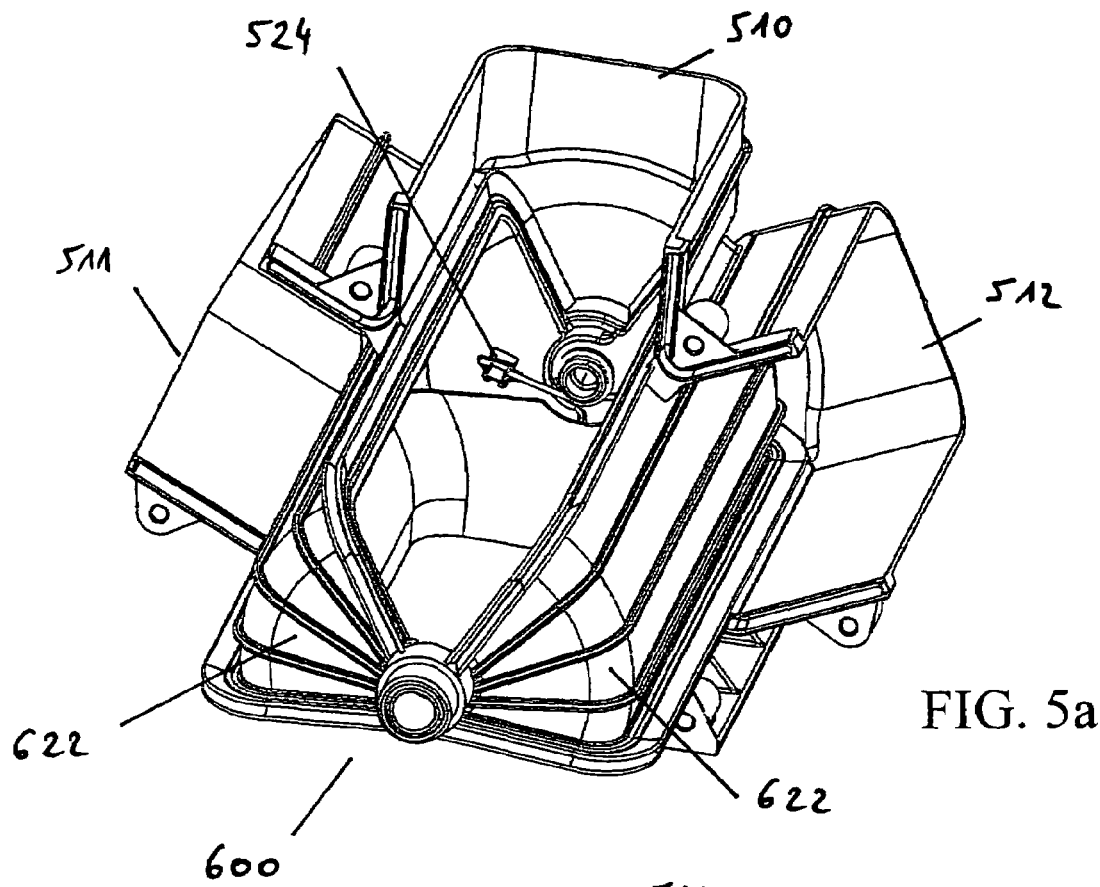
FIGS. 5a and 5b show a perspective cross-sectional view of an automotive HVAC unit with three outlets and air valve devices, in accordance with an aspect of the present invention.
Figure 5B:
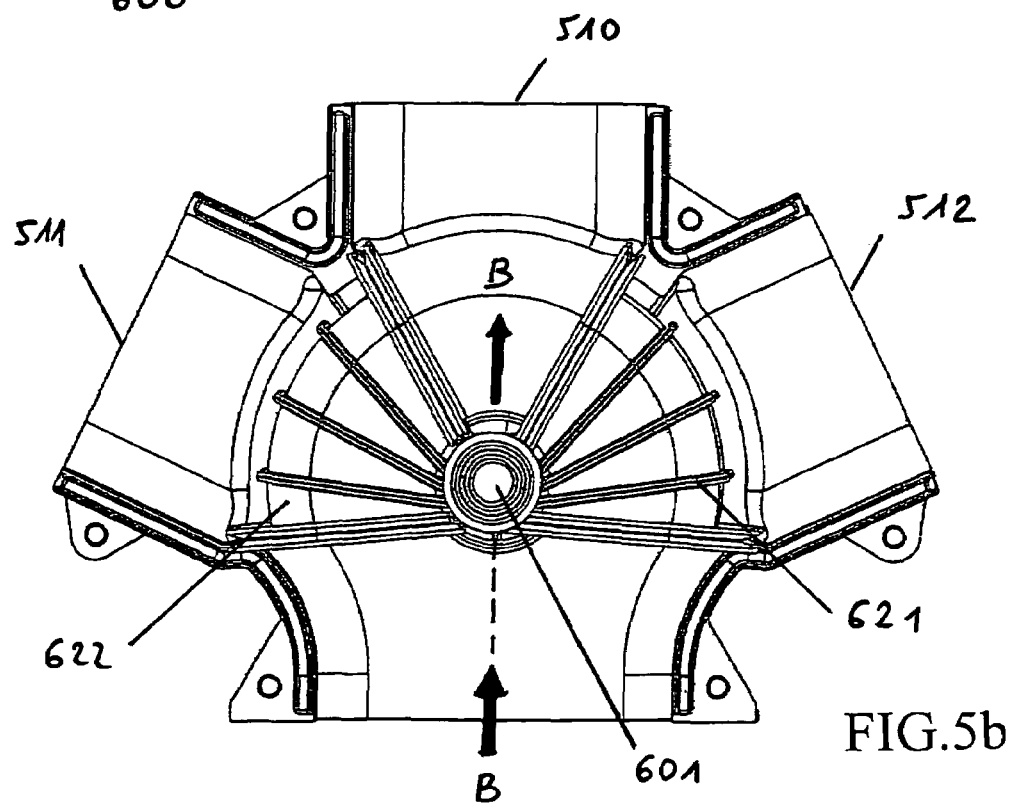

FIGS. 5a and 5b illustrate an HVAC unit section 500, having housing outlets (510, 511, 512) positioned downstream of multiple air valve unit (600). Central axis (601) of multiple air valve unit is shown, with first barrel door (621) and second barrel door (622) in an open position. FIG. 5b shows multiple air valve unit (600) which allows air flow B-B, in the full wide position, only to air outlet (510).

Figure 6:
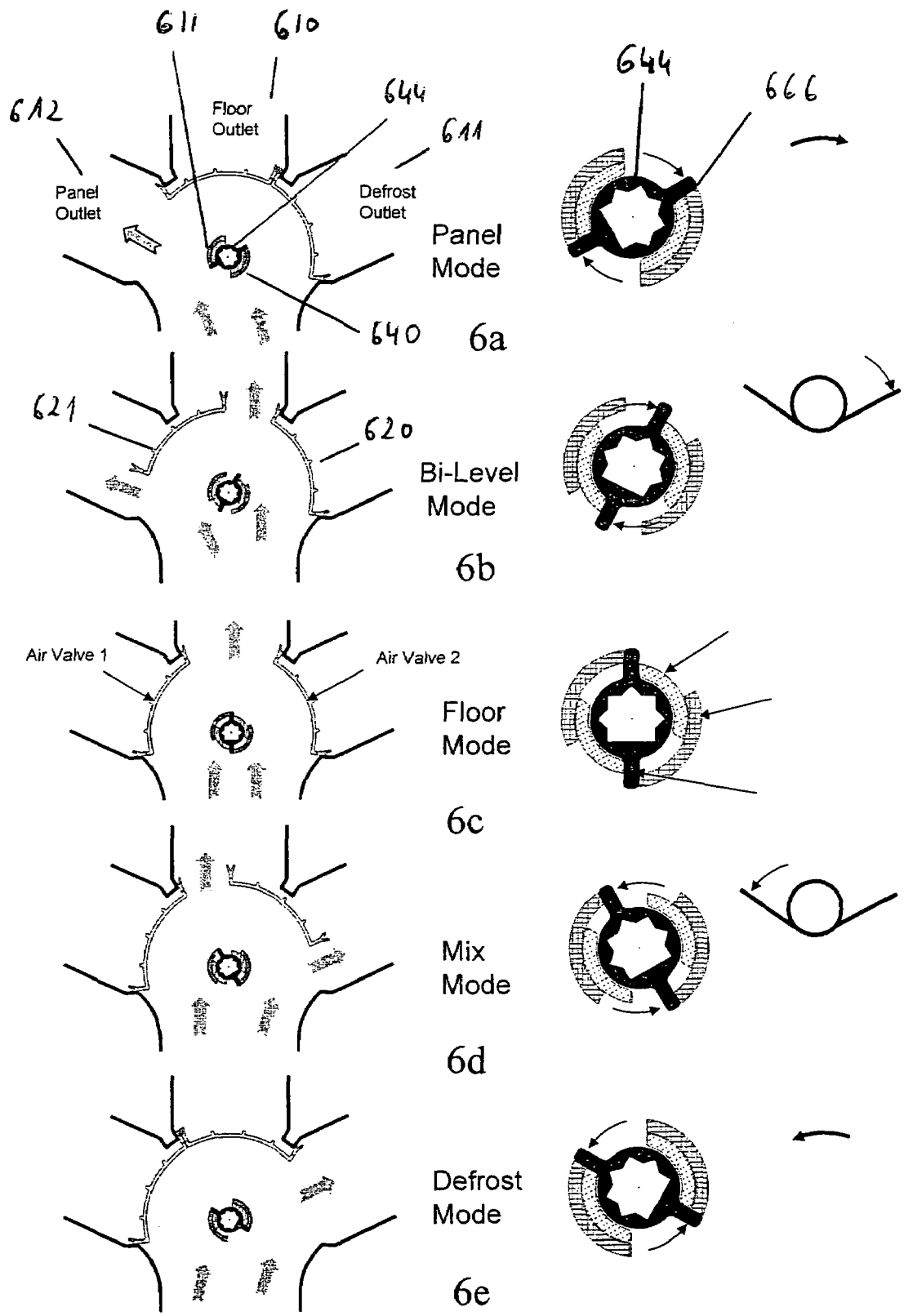
FIG. 6 shows a cross sectional schematic view of the HVAC unit shaft, two air valve devices and three air outlets in various outlet modes, in accordance with an aspect of the present invention.

FIG. 6 (a-d) shows a cross sectional view of air outlets (610, 611 and 612) which represent floor outlets, defrost outlet and panel outlet, respectively. Shafts (640, 641) of multiple air valve unit are illustrated, with motion transferor (644) in various positions. Position of air valve devices (620, 621) are deformed by actuation force on motion transferor (644) guided by actuator blade (666). Arrows indicate the force of the actuation device on the air valve devices, with spring, for example, creating clockwise force to hold second air valve device (620) in position on 6b bi-level mode, and likewise counter clockwise force to hold first air valve device (621) in position in 6(d) in mix mode.

Figure 7A:
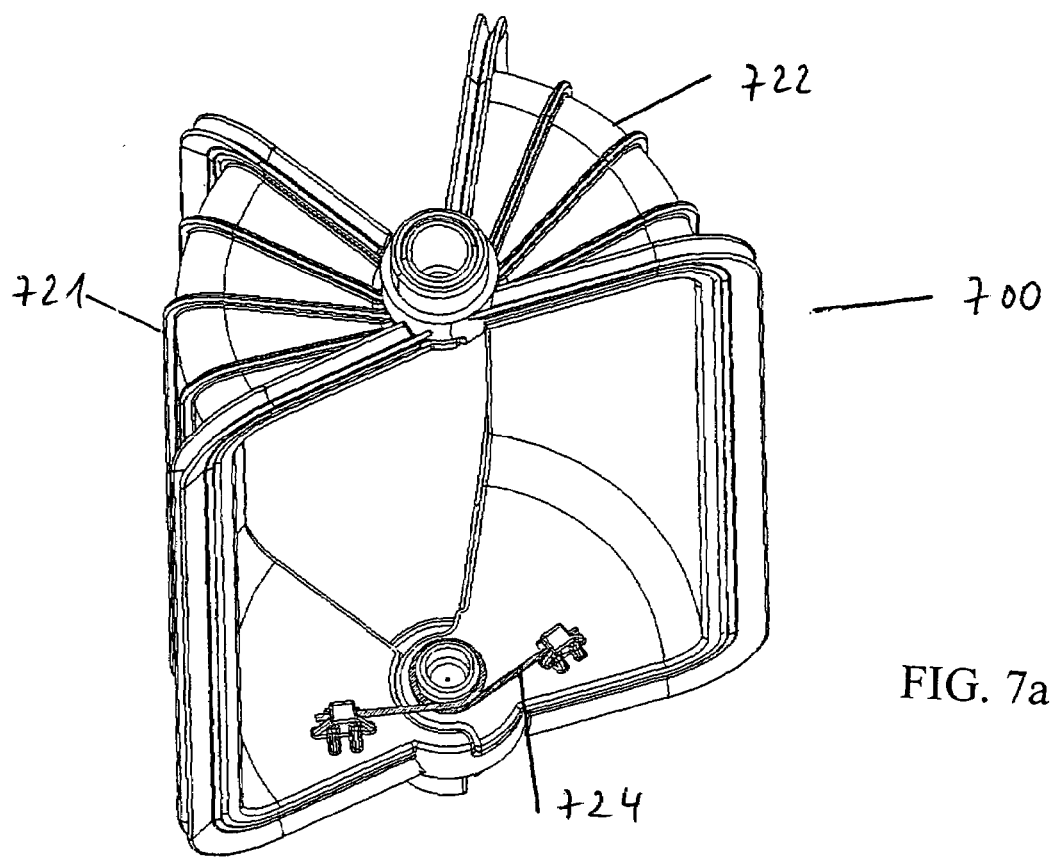
FIGS. 7a and 7b are side schematic view of multiple air valve device unit having repulsion mechanism and barrel doors, in accordance with an aspect of the present invention.
Figure 7B:
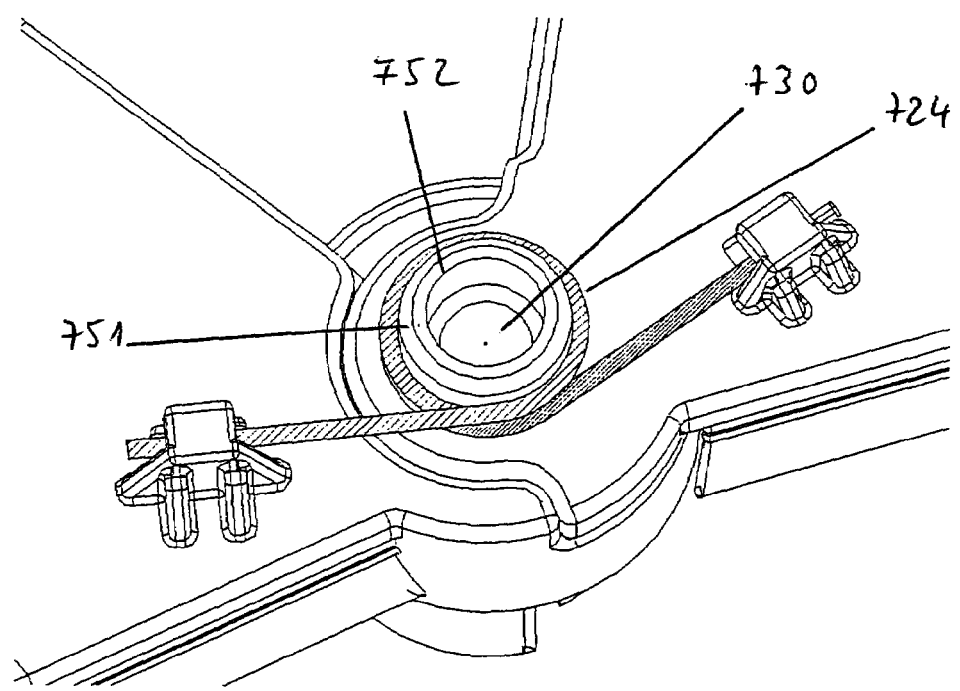

FIGS. 7a and 7b show barrel shaped doors (722, 721) of multiple air valve device (700), and repulsion device, in this case, a spring (724) around concentric shafts (751, 752) of doors. Common axis (730) is represented by a point.

Figure 8:
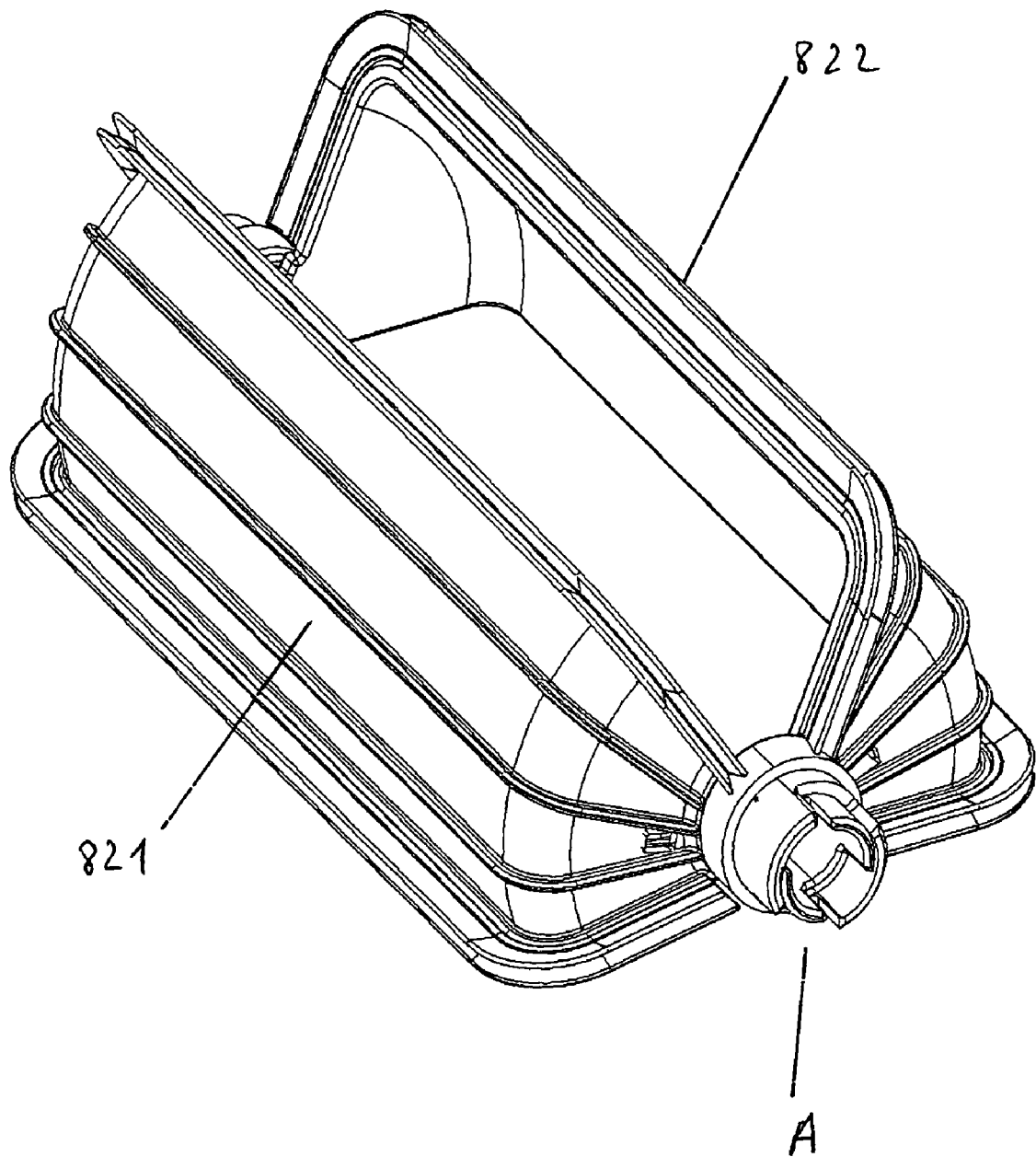
FIG. 8 is a schematic view of a multiple air valve device unit showing common shaft, and overlapping inner and outer shafts that interface with actuation mechanism, in accordance with an aspect of the present invention.

FIG. 8 shows two barrel shaped doors, of identical shape (822, 821) except at the area of shaft A which serves as the point of interface for an actuation device or motion transferor (not shown).

Figure 9:
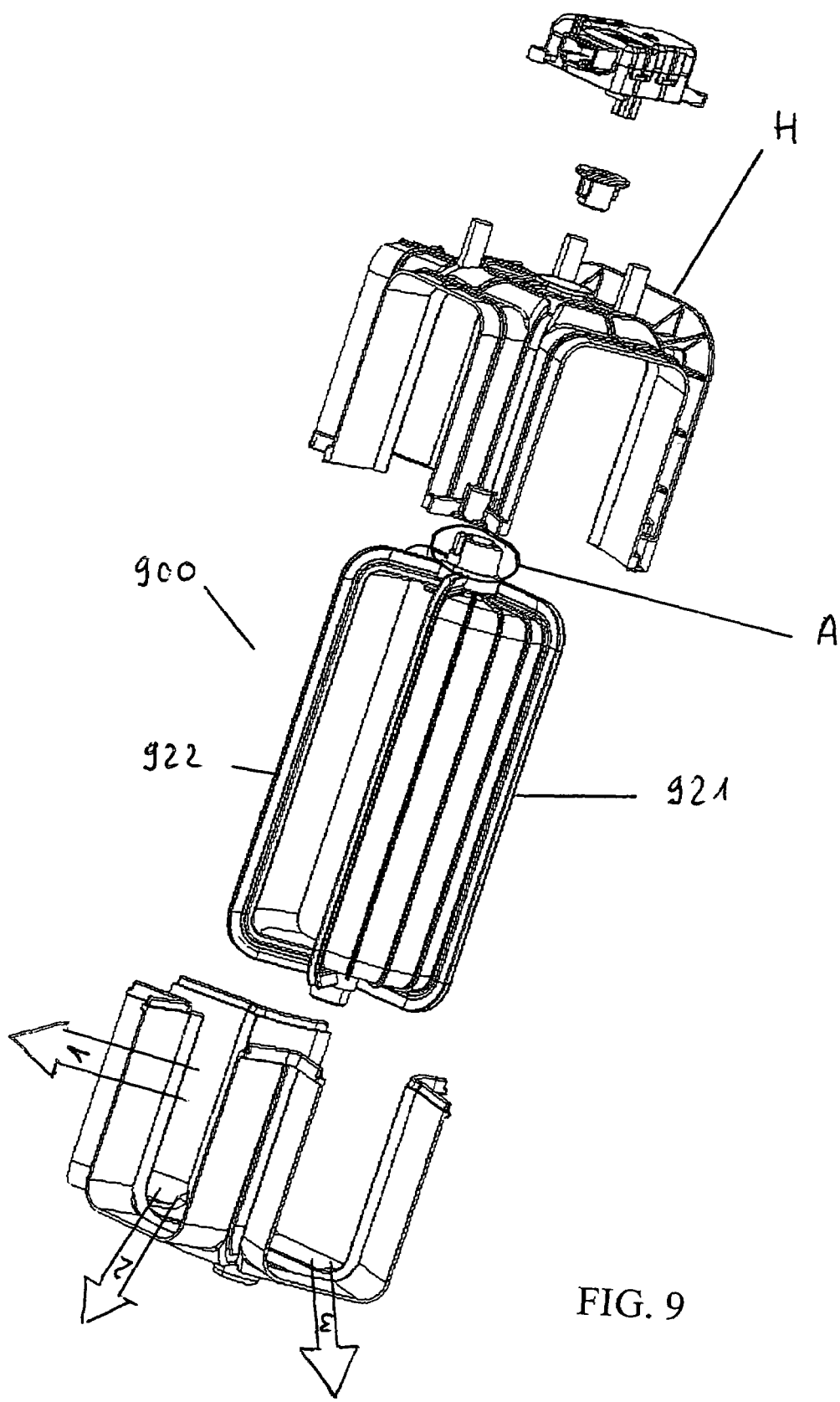
FIG. 9 shows an exploded schematic version of a multiple air valve unit, having actuator and motion transferor, in accordance with an aspect of the present invention.

FIG. 9 illustrates use of one actuation device (931) to interface with a motion transferor (932) which allows movement around of common axis of multiple air valve unit (900) components (air valve devices (921, 922)) at the area of their shaft A. HVAC housing H shows air path (1, 2, 3) through outlet areas for 3 air outlet downstream of multiple air valve unit (900).

Figure 10:
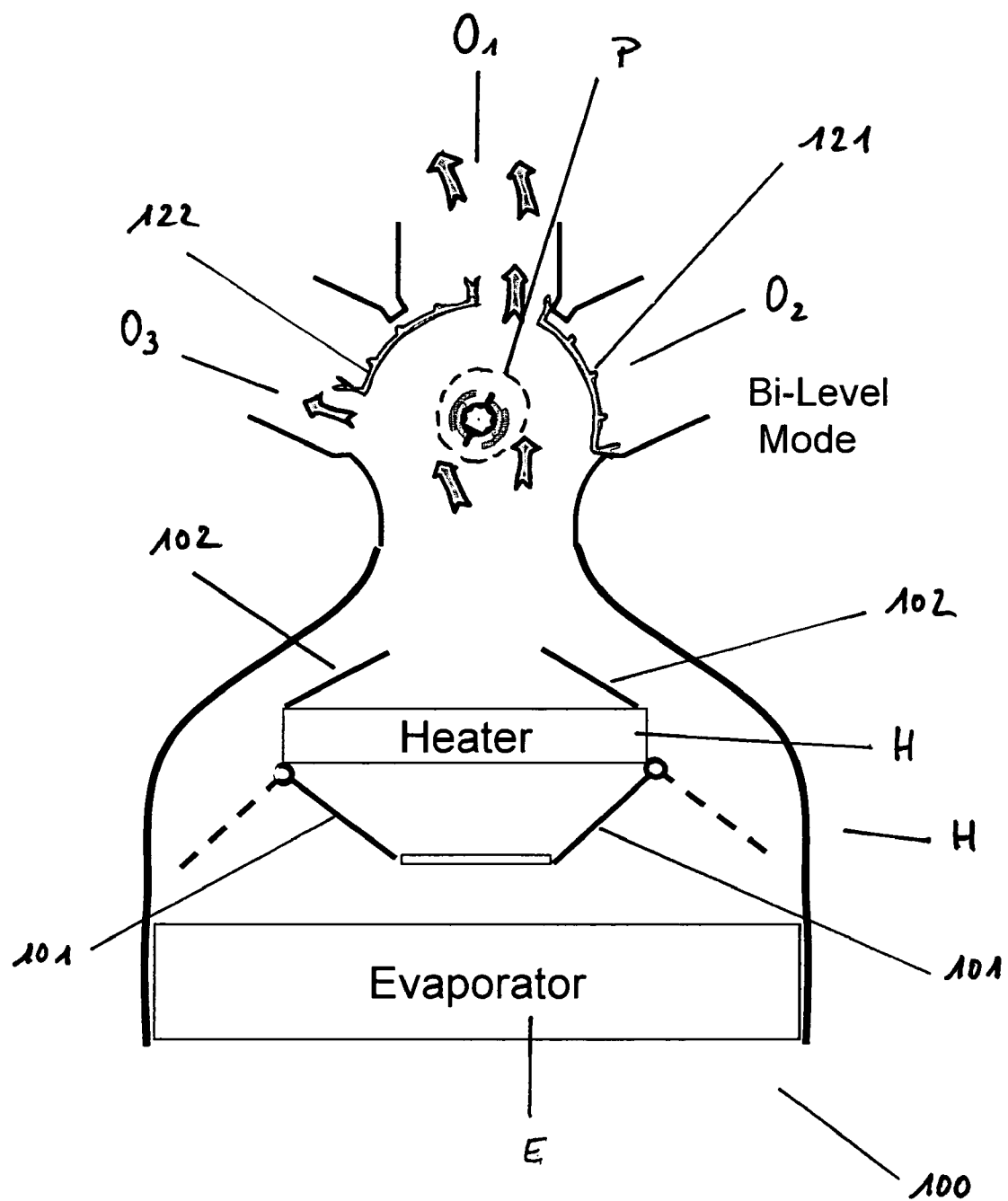
FIG. 10 is a schematic representation of an automotive HVAC unit showing air flow into multiple air valve device unit and discharged air flow in the bi-level outlet mode into two of the three outlets, in accordance with an aspect of the present invention. This particular configuration demonstrates a means of achieving hotter temperatures at outlet 2 than in outlet 1 or 3.

FIG. 10 is an automotive HVAC unit (100) with housing H, evaporator E in housing H, heater core H, downstream of evaporator E and various doors (101, 102) to control air flow upstream of air valve devices (121, 122) of the multiple air valve unit. Air outlets $0_1$, $0_2$ and $0_3$ are opened or closed via movement of air valve devices (121, 122) are located.

Figure 11:
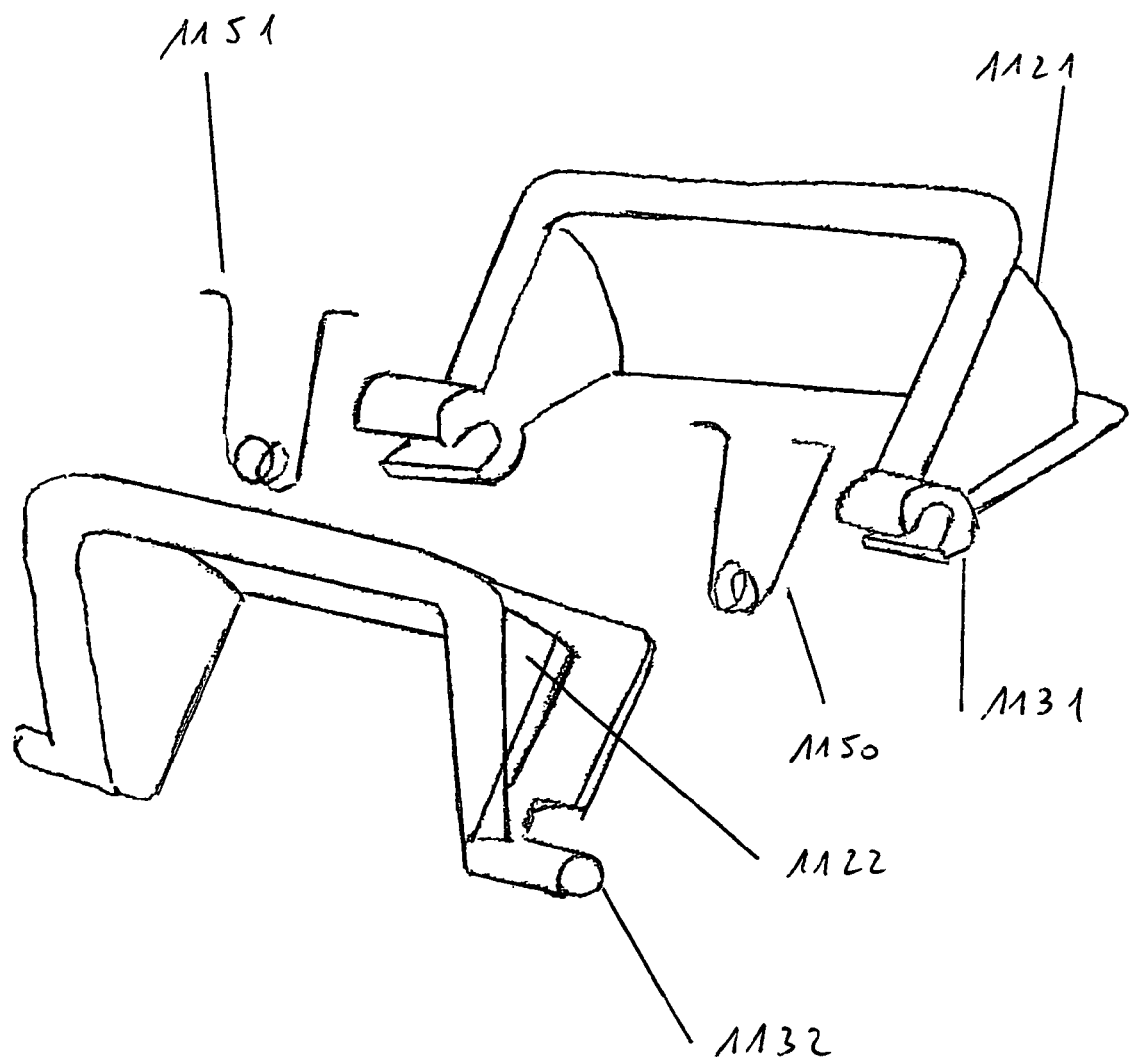
FIG. 11 shows a schematic exploded view of a multiple air valve unit comprising two air valve devices and two repulsion devices in accordance with an aspect of the present invention.

FIG. 11 shows shafts (1131, 1132) of air valve devices (1121, 1122) and repulsion means (1150, 1151) respectively on each end of the air valve device (1122, 1121).

When the actuator torque is applied, it only applies torque to one air valve at a time. The direction of the torque imparted by the actuator on air valve one is always in the same direction, and is always opposite of the direction of the torque imparted by the repulsion mechanism on air valve one. The direction of the torque imparted by the actuator on air valve two is always opposite of that of air valve one. It is always in the same direction, and is always opposite of the direction of the torque imparted by the repulsion mechanism on air valve two.

FIG. 6c, shows the valve mechanisms in a natural position without any torque applied from the actuator. The repulsion mechanism applies equal and opposite torque to Air Valve 1 and Air Valve 2, positioning them away from each other and forcing them to seal as shown in FIG. 6c, with an air path between the air valves.

In order to achieve positions as shown in FIGS. 6a and 6b, the actuator device applies a clockwise (as shown in the figure) torque to air valve one, overcoming the spring force and rotating the valve clockwise. During this motion, the air valve two shaft interface does not engage with the actuator blade and, therefore, no torque is applied from the actuator to air valve two, allowing air valve two to stay in its previous position. The geometry of the shaft interface and actuator blade that achieves this functionality is shown in FIGS. 6a, 6b, and 6c. In the position shown in FIG. 6a, the seal of air valve one compresses against the seal surface of air valve two. By reversing the motion of the actuation device, the repulsion mechanism provides a torque keeping the air valve one shaft interface engaged with the actuator blade, and air valve one follows the actuator position until sealing in the full counter-clockwise position shown in FIG. 6c.

In order to achieve positions as shown in FIGS. 6d and 6e, process and mechanisms described for achieving positions as shown in 6a and 6b apply in the opposite direction. The actuator device applies a counter-clockwise (as shown in the figure) torque to air valve two, overcoming the spring force and rotating the valve counter-clockwise. During this motion, the air valve one shaft interface does not engage with the actuator blade and, therefore, no torque is applied from the actuator to air valve one, allowing air valve one to stay in its previous position. The geometry of the shaft interface and actuator blade that achieves this functionality is shown in FIGS. 6c, 6d, and 6e. In the position shown in FIG. 6e, the seal of air valve two compresses against the seal surface of air valve one. By reversing the motion of the actuation device, the repulsion mechanism provides a torque keeping the air valve two shaft interface engaged with the actuator blade, and air valve two follows the actuator position until sealing in the full clockwise position shown in FIG. 6c.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skills in the art would realize, however, that certain modifications will come within the teachings of this invention. Therefore, the following claims should be studied to determine the true scope and content of the invention.

What is claimed is:

1. An automotive HVAC unit having at least three air outlets and a multiple air valve unit to direct and/or control air passage into the three air outlets, the multiple air valve unit comprising:
   at least two air valve devices;
   a repulsion device in contact with the at least two air valve devices;
   at least one hollow outer shaft disposed on one of the at least two air valve devices, the at least one hollow outer shaft having two outer slots opposed to each other along a circumference of the hollow outer shaft;
   at least one hollow inner shaft disposed on an other of the at least two air valve devices, the at least one hollow inner shaft having two inner slots opposed to each other along a circumference of the hollow outer shaft, the at least one hollow inner shaft being coaxial with, and rotatable within the at least one hollow outer shaft; and
   the actuation of the at least two air valve devices occurring via one interface with the multiple air valve unit;
   wherein the multiple valve unit has a geometry that allows for a common rotational axis of the at least two air valve devices.

2. The automotive HVAC unit as in claim 1, further comprising an actuation device interfacing with the at least one hollow outer shaft and the at least one hollow inner shaft by selectively engaging with the outer slot and the inner slot, wherein:
   the outer slot is configured to allow a flat actuator blade to rotate freely with respect to the at least one hollow outer shaft by an angle equal to a total rotation angle of the at least one hollow inner shaft; and
   the inner slot is configured to allow the flat actuator blade to rotate freely with respect to the at least one hollow inner shaft by an angle equal to a total rotation angle of the at least one hollow outer shaft.

3. An automotive HVAC unit as in claim 2 wherein the at least one hollow outer shaft and the at least one hollow inner shaft interface directly or indirectly through a motion transferor to the actuation device, the at least one hollow outer shaft and the at least one hollow inner shaft having a rotational clearance to allow relative rotational motion between the actuation device and the at least two air valve devices.

4. A multiple air valve unit, comprising:
   at least two air valve devices;
   at least two air valve device hollow shafts, each air valve device hollow shaft on a respective one of the at least two air valve devices;
   at least one slot defined at an end of each of the at least two air valve device hollow shafts;
   at least one flat actuator blade selectively interfacing with the at least two air valve device hollow shafts; and
   at least one repulsion device in contact with the at least two air valve devices;
   wherein the at least two air valve devices have a common axis of rotation.

5. The multiple air valve unit as in claim 4 wherein:
   one air valve device hollow shaft forms an inner shaft;
   an other air valve device hollow shaft forms an outer shaft, such that the inner shaft and the outer shaft are both rotatable via the at least one flat actuator blade;
   the at least one slot defined at an end of the outer shaft is configured to allow the flat actuator blade to rotate freely with respect to the outer shaft by an angle equal to a total rotation angle of the inner shaft; and
   the at least one slot defined at an end of the inner shaft is configured to allow the flat actuator blade to rotate freely with respect to the inner shaft by an angle equal to a total rotation angle of the outer shaft.

6. The multiple air valve unit as in claim 4, further comprising a motion transferor, wherein the motion transferor directly interfaces with the at least one flat actuator blade.

7. The multiple air valve unit as in claim 5, further comprising a motion transferor.

8. The multiple air valve unit as in claim 4 wherein the at least two air valve devices are barrel shaped.

9. The multiple air valve unit as in claim 5 wherein the at least two air valve devices are barrel shaped.

10. The multiple air valve unit as in claim 6 wherein the at least two air valve devices are barrel shaped.

11. The multiple air valve unit as in claim 4 wherein the repulsion device applies a force to separate the at least two air valve devices from one another and thereby allows air passage between the at least two air valve devices.

12. The multiple air valve unit as in claim 6 wherein the repulsion device applies a force to separate the at least two air valve devices from one another and thereby allows air passage between the at least two air valve devices.

13. The multiple air valve unit as in claim 12, further comprising an actuation device.

14. The multiple air valve unit as in claim 13 where the actuation device is part of an automotive HVAC unit.

15. The automotive HVAC unit as in claim 1 wherein the repulsion device is configured to apply a force to separate one of the at least two air valve devices from another, the force creating a torque on the at least two air valve devices.

16. The automotive HVAC unit as in claim 15, further comprising an actuation device configured to apply an other force to the at least two air valve devices causing the at least two air valve devices to move one of the at least two air valve devices toward another, the other force of the actuation device creating an other torque on the at least two air valve devices, wherein the torque on the at least two air valve devices is i) less than the other torque, and ii) greater than a force on the at least two air valve devices from gravity and from air impinging on the at least two air valve devices.

17. The automotive HVAC as in claim 1 wherein the repulsion device is a spring.

18. The automotive HVAC as in claim 17 wherein the spring is a torsion spring.

19. The multiple air valve unit as in claim 4 wherein the repulsion device is configured to apply a force to separate one of the at least two air valve devices from another, the force creating a torque on the at least two air valve devices.

20. The multiple air valve unit as in claim 19, further comprising an actuation device configured to apply an other force to the at least two air valve devices causing the at least two air valve devices to move one of the at least two air valve devices toward another, the other force of the actuation device creating an other torque on the at least two air valve devices, wherein the torque on the at least two air valve devices is i) less than the other torque, and ii) greater than a force on the at least two air valve devices from gravity and from air impinging on the at least two air valve devices.

21. The multiple air valve unit as in claim 4 wherein the repulsion device is a spring.

* * * * *